US009899047B2

(12) United States Patent
Gadbois et al.

(10) Patent No.: US 9,899,047 B2
(45) Date of Patent: Feb. 20, 2018

(54) BOND PAD SHARING FOR POWERING A MULTIPLICITY OF ELECTRICAL COMPONENTS

(71) Applicant: Seagate Technology LLC, Cupertino, CA (US)

(72) Inventors: Jason Bryce Gadbois, Shakopee, MN (US); Declan Macken, Prior Lake, MN (US); Karsten Klarqvist, Roseville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 424 days.

(21) Appl. No.: 14/050,725

(22) Filed: Oct. 10, 2013

(65) Prior Publication Data

US 2015/0103430 A1   Apr. 16, 2015

(51) Int. Cl.
G11B 5/48   (2006.01)
G11B 5/49   (2006.01)
G11B 5/00   (2006.01)

(52) U.S. Cl.
CPC .......... G11B 5/4853 (2013.01); G11B 5/4886 (2013.01); G11B 5/4976 (2013.01); G11B 2005/0008 (2013.01); G11B 2005/0021 (2013.01)

(58) Field of Classification Search
CPC ... G11B 5/6005; G11B 5/6064; G11B 5/4853; G11B 5/4976; G11B 5/4886; G11B 2005/0021; G11B 2005/0008
USPC ................................ 360/234.3, 234.4, 234.5
See application file for complete search history.

(56) References Cited

U.S. PATENT DOCUMENTS

| 4,914,398 | A |   | 4/1990 | Jove et al. |
| 5,298,641 | A |   | 3/1994 | Stewen |
| 5,494,473 | A | * | 2/1996 | Dupuis et al. ............... 451/1 |
| 5,527,110 | A |   | 6/1996 | Abraham et al. |
| 5,610,783 | A |   | 3/1997 | Maffitt et al. |
| 5,712,747 | A |   | 1/1998 | Voldman et al. |
| 5,748,412 | A |   | 5/1998 | Murdock et al. |
| 5,768,068 | A |   | 6/1998 | Eckberg et al. |
| 5,850,374 | A |   | 12/1998 | Abraham et al. |
| 5,896,249 | A |   | 4/1999 | Fontana, Jr. et al. |
| 6,034,849 | A | * | 3/2000 | Takizawa ................ 360/128 |
| 6,052,249 | A |   | 4/2000 | Abraham et al. |
| 6,347,983 | B1 | * | 2/2002 | Hao et al. .................. 451/57 |
| 6,396,667 | B1 |   | 5/2002 | Zhang et al. |
| 6,623,330 | B2 | * | 9/2003 | Fukuroi ..................... 451/5 |
| 6,813,118 | B2 | * | 11/2004 | Pust et al. ............... 360/234.5 |
| 7,088,543 | B2 | * | 8/2006 | Satoh et al. ................ 360/75 |
| 7,119,990 | B2 |   | 10/2006 | Bajorek et al. |
| 7,133,254 | B2 | * | 11/2006 | Hamann et al. ......... 360/125.74 |
| 7,362,534 | B1 |   | 4/2008 | Schreck et al. |
| 7,446,977 | B2 | * | 11/2008 | Nikitin et al. ............ 360/234.5 |

(Continued)

OTHER PUBLICATIONS

File History for U.S. Appl. No. 13/836,124.

*Primary Examiner* — Brian Miller
(74) *Attorney, Agent, or Firm* — Hollingsworth Davis, LLC

(57) ABSTRACT

A bond pad set includes at least one ground pad and at least one electrical bond pad configured to bias and send/receive signals. The bond pad set is electrically connected to a multiplicity of electrical components. At least one electrical bond pad of the bond pad set is shared between two or more of the electrical components.

16 Claims, 10 Drawing Sheets

(56) References Cited

U.S. PATENT DOCUMENTS

| | | | |
|---|---|---|---|
| 7,466,516 B2 * | 12/2008 | Lille | 360/234.5 |
| 7,551,406 B1 * | 6/2009 | Thomas et al. | 360/317 |
| 7,589,936 B1 | 9/2009 | McFadyen et al. | |
| 7,643,250 B2 * | 1/2010 | Araki et al. | 360/234.5 |
| 7,782,568 B2 * | 8/2010 | Shiraki et al. | 360/234.5 |
| 7,936,538 B1 | 5/2011 | Zhang et al. | |
| 7,969,687 B2 * | 6/2011 | Lee et al. | 360/234.5 |
| 8,098,450 B2 | 1/2012 | Baumgart et al. | |
| 8,159,780 B2 | 4/2012 | Brand | |
| 8,169,751 B2 * | 5/2012 | Albrecht et al. | 360/323 |
| 8,297,113 B2 | 10/2012 | Liners et al. | |
| 8,310,779 B2 | 11/2012 | Hanchi | |
| 8,400,736 B2 * | 3/2013 | Greminger et al. | 360/234.5 |
| 8,432,636 B2 | 4/2013 | Brand | |
| 8,804,272 B1 | 8/2014 | Dakroub et al. | |
| 8,879,189 B2 * | 11/2014 | Miyamoto et al. | 360/55 |
| 8,937,791 B1 | 1/2015 | Olson et al. | |
| 8,947,807 B2 | 2/2015 | Heim et al. | |
| 8,953,275 B2 | 2/2015 | Chou et al. | |
| 9,607,640 B2 * | 3/2017 | Macken | G11B 7/125 |
| 2005/0024775 A1 | 2/2005 | Kurita et al. | |
| 2005/0190495 A1 | 9/2005 | Lille | |
| 2005/0213250 A1 | 9/2005 | Kurita et al. | |
| 2006/0056110 A1 | 3/2006 | Kato et al. | |
| 2006/0203387 A1 | 9/2006 | White et al. | |
| 2007/0035881 A1 * | 2/2007 | Burbank et al. | 360/234.3 |
| 2007/0230056 A1 * | 10/2007 | Beach et al. | 360/234.5 |
| 2007/0274005 A1 | 11/2007 | Zhu et al. | |
| 2008/0074797 A1 | 3/2008 | Ikai et al. | |
| 2009/0040645 A1 | 2/2009 | Shimazawa et al. | |
| 2009/0052076 A1 | 2/2009 | Shimazawa et al. | |
| 2009/0052077 A1 | 2/2009 | Tanaka et al. | |
| 2009/0195930 A1 * | 8/2009 | Lille | 360/234.5 |
| 2009/0251821 A1 | 10/2009 | Song et al. | |
| 2009/0262460 A1 | 10/2009 | Hanchi | |
| 2010/0226044 A1 * | 9/2010 | Iwase | 360/234.3 |
| 2011/0013316 A1 | 1/2011 | Brand | |
| 2011/0019311 A1 | 1/2011 | Greminger et al. | |
| 2011/0248167 A1 | 10/2011 | Gurvitch et al. | |
| 2012/0113207 A1 | 5/2012 | Zheng | |
| 2012/0120519 A1 | 5/2012 | Kunkel et al. | |
| 2012/0120522 A1 | 5/2012 | Johnson et al. | |
| 2012/0120527 A1 | 5/2012 | Kunkel et al. | |
| 2012/0327529 A1 | 12/2012 | Hutchinson et al. | |
| 2013/0188273 A1 | 7/2013 | Miyamoto et al. | |
| 2013/0314817 A1 | 11/2013 | Otsuki | |
| 2014/0160906 A1 | 6/2014 | Yamada | |
| 2014/0177083 A1 | 6/2014 | Heim et al. | |
| 2014/0269838 A1 | 9/2014 | Macken | |

* cited by examiner

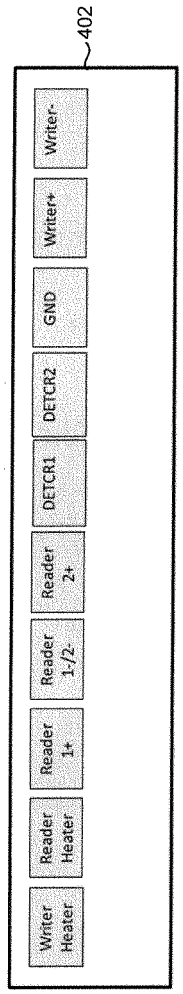
Figure 4
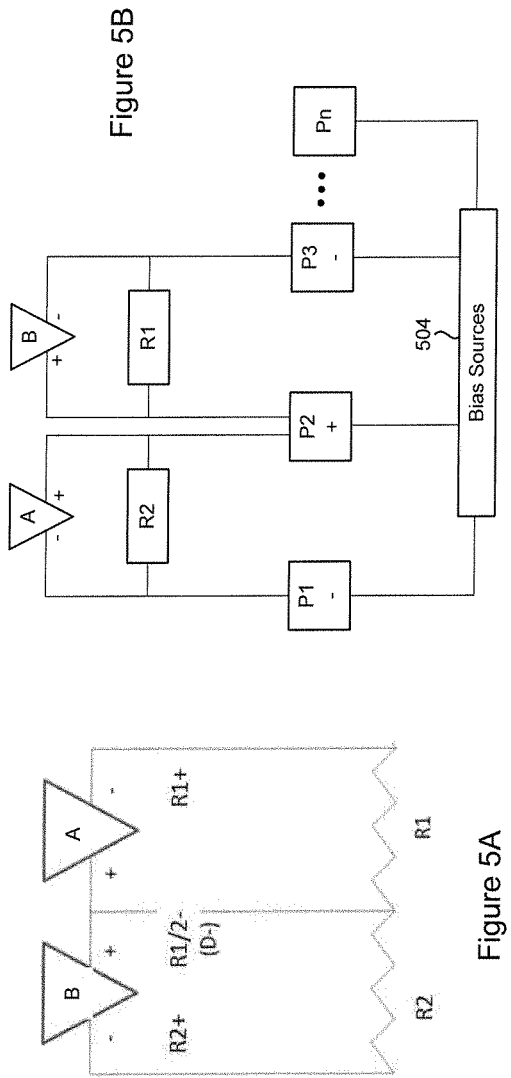
Figure 5B
Figure 5A

BOND PAD SHARING FOR POWERING A MULTIPLICITY OF ELECTRICAL COMPONENTS

SUMMARY

Embodiments of the disclosure are directed to apparatuses and methods that provide for bond pad sharing for powering a plurality of electrical components. According to various embodiments, a system comprises a bond pad set electrically connected to a plurality of electrical components and comprising at least one ground pad and at least one electrical bond pad. The at least one electrical bond pad is shared between two or more of the electrical components. In other embodiments, an apparatus comprises a bond pad set electrically connected to bias sources and comprising at least one ground pad and at least one electrical bond pad. A plurality of electrical components is coupled to the bias sources via the bond pad set. The at least one electrical bond pad is shared between two or more of the electrical components.

In accordance with other embodiments, an apparatus includes a slider comprising a plurality of electrical bond pads coupled to bias sources. Each of a plurality of electrical components of the slider is coupled to at least one of the electrical bond pads. At least one of the electrical bond pads is a shared electrical bond pad coupled to at least two of the electrical components.

In further embodiments, an apparatus includes a slider comprising a ground pad and a plurality of electrical bond pads coupled to bias sources. Each of a plurality of electrical components is coupled to at least one of the electrical bond pads. A writer is coupled between one of the electrical bond pads and the ground pad.

According other embodiments, a method comprises biasing a plurality of electrical bond pads of a recording transducer. The plurality of electrical bond pads is coupled to a plurality of electrical components of the recording transducer. The method further comprises activating selected electrical components of the recording transducer. At least one of the electrical components shares an electrical bond pad with another of the electrical components.

These and other features and aspects of various embodiments may be understood in view of the following detailed discussion and accompanying drawings.

BRIEF DESCRIPTION OF THE DRAWINGS

FIG. 4 illustrates a set of bond pads configured for bond pad sharing by a multiplicity of readers in accordance with various embodiments of the disclosure;

FIGS. 5A and 5B illustrate circuit and block diagram implementations for bond pad sharing by a multiplicity of readers in accordance with various embodiments of the disclosure;

DETAILED DESCRIPTION

Figure 1:
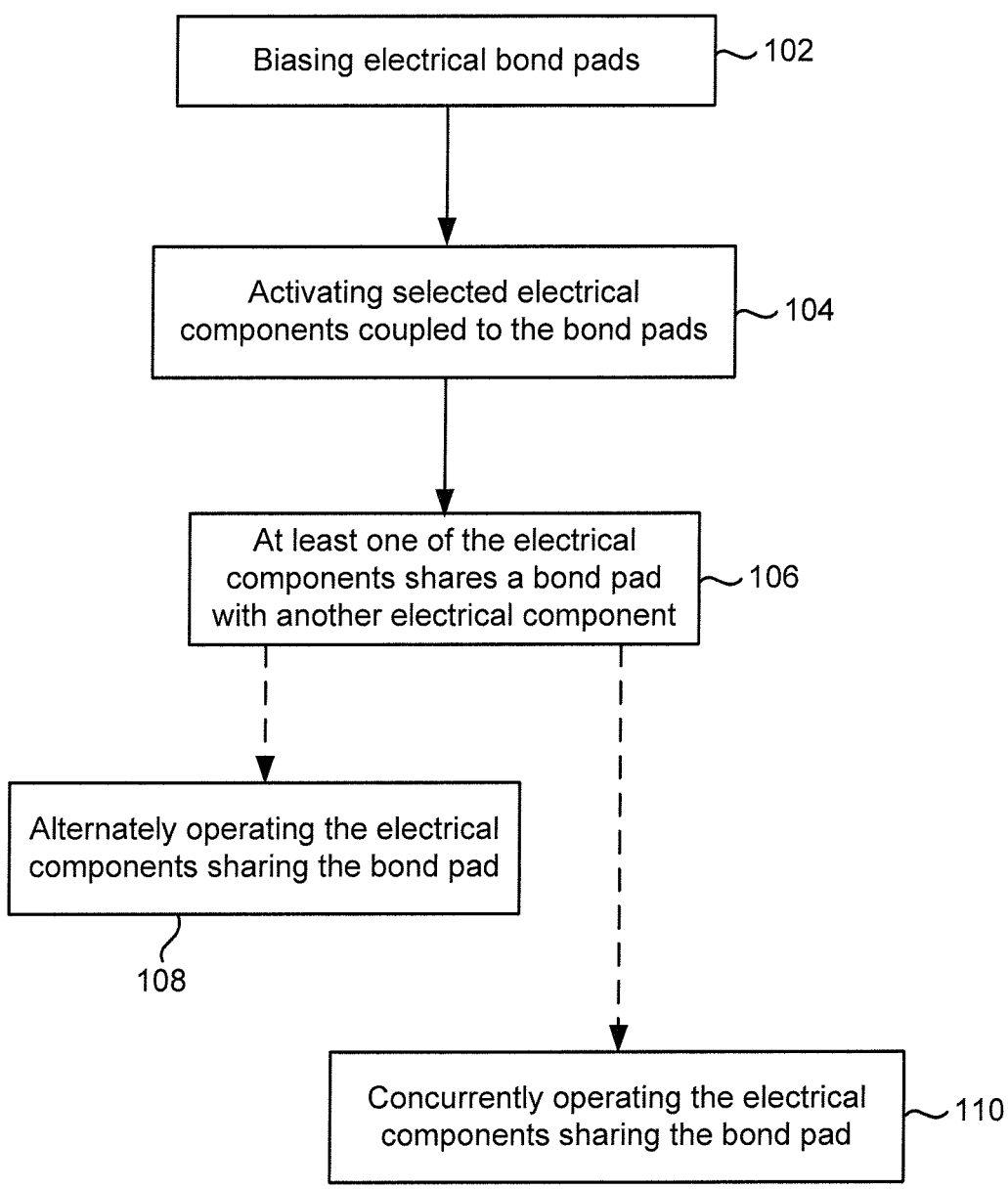
FIG. 1 is a flow diagram showing various processes involving bond pad sharing for powering a multiplicity of electrical components in accordance with embodiments of the disclosure.

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include a reader, a reader heater, a writer, and a writer heater, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

Embodiments of the disclosure relate to set of bond pads coupled to bias sources and a multiplicity of electrical components coupled to the bond pad set, wherein at least one of the bond pads is shared between at least two of the electrical components. Shared use of a bond pad coupled to a bias source obviates the need for an additional pair of bond pads for each additional electrical component. For example, bond pad sharing according to various embodiments provides for powering N electrical components using N+1 bond pads coupled to bias sources, where each electrical component requires two bond pads for proper operation.

Various embodiments of the disclosure are directed to a transducer that incorporates a set of bond pads coupled to bias sources and a multiplicity of electrical components coupled to the bond pad set, wherein at least one of the bond pads is shared between at least two of the electrical components. The transducer can include two or more electrically activated components, such as a writer, one or more readers, one or more heaters, and one or more sensors, for example.

Various embodiments are directed to a transducer that incorporates a set of bond pads coupled to respective DC and AC bias sources and a multiplicity of DC components coupled to the bond pad set, wherein at least one of the bond pads coupled to a DC bias source is shared between at least two of the DC components. Some embodiments are directed to a transducer that incorporates a set of bond pads coupled to respective DC and AC bias sources and a multiplicity of AC components coupled to the bond pad set, wherein at least one of the bond pads coupled to an AC bias source is shared between at least two of the AC components. Other embodiments are directed to a transducer that incorporates a set of bond pads coupled to respective DC and AC bias sources and a multiplicity of AC and DC components is coupled to the bond pad set, wherein at least one of the bond pads is shared between an AC component and a DC component, such as by alternately operating the AC and DC components.

Some embodiments are directed to a transducer that incorporates a set of bond pads coupled to bias sources and a multiplicity of readers coupled to the bond pad set, wherein at least one of the bond pads is shared between at least two of the readers. Other embodiments are directed to a transducer that incorporates a set of bond pads coupled to bias sources. A multiplicity of readers and at least one sensor are coupled to the bond pad set, and at least one of the bond pads is shared between at least one reader and at least one sensor. Further embodiments are directed to a transducer that incorporates a set of bond pads coupled to bias sources. At least one reader and at least one writer heater are coupled to the bond pad set, and at least one of the bond pads is shared between at least one reader and at least one writer heater.

Some embodiments are directed to a transducer that incorporates a set of bond pads coupled to bias sources and at least three readers coupled to the bond pad set, wherein three of the bond pads are shared between the three readers. Still other embodiments are directed to a transducer that incorporates a set of bond pads coupled to bias sources and a multiplicity of heaters, including at least one writer heater and at least one reader heater each coupled to the bond pad set via a respective diode. Two of the bond pads are shared between the at least one writer heater and at least one reader heater, with current flowing alternately through the at least one writer heater and at least one reader heater based on the conductance state of the diodes. Some embodiments are directed to a transducer that incorporates a set of bond pads coupled to bias sources and a writer coupled to one of the bond pads and ground. A single-ended writer coupled between one bond pad and ground is well-suited for incorporation in a heat-assisted or thermally-assisted magnetic recording head (e.g., a HAMR or TAMR head).

As discussed above and further described hereinbelow, some embodiments of the disclosure are directed to an apparatus configured to provide pad sharing between a multiplicity of readers. Multiple readers offer the potential for increasing drive read data rate and/or areal density. Each additional reader requires additional bond pads to connect it to its associated bias source. By sharing a bond pad between at least one of the readers and another component, such as another reader, a sensor (e.g., contact sensor) or writer heater, the pad count is reduced or minimized, which results in a lower-cost, simplified bond pad layout and slider/head gimbal assembly (HGA) process.

According to some embodiments, a magnetic recording apparatus includes a multiplicity of separately addressable readers, at least two of which are configured for bond pad sharing. A recording transducer configured for bond pad sharing between a multiplicity of readers can be implemented in a shingled recording system according to various embodiments. Shingled recording involves writing tracks that overlap part of previously written tracks. The write head includes features such as high field strength and sharp corner-edge field that can result in narrower tracks. However, existing read transducers may have difficulty reading back these narrower tracks. For example, shrinking the read transducers in a cross-track direction may decrease signal-to-noise ratio. As a result, two-dimensional magnetic recording (TDMR) is proposed to facilitate reading back data from narrower tracks with a read transducer that is wider than the tracks. In some embodiments, more than two read transducers are used to implement two-dimensional recording and arranged in a transducer array. All of the read transducers in the array can be centered over respective tracks and, because the read transducers are wider than the tracks, each read transducer overlaps two adjacent tracks.

An issue with adding additional readers or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

One example of this approach involves a bond pad shared between a contact sensor (e.g., a thermal coefficient of resistance (TCR) contact sensor) and a reader. In some embodiments, a contact sensor may not be required to be active at the same time as a reader, so there is little risk of contention on the shared bond pad. A TCR contact sensor and a typical reader, for example, are primarily resistive loads and so the addition of an extra termination load on the other non-shared reader pad will mostly mitigate any impedance mismatch on the two reader traces back to the pre-amplifier, thus minimizing the impact of common mode noise.

FIG. 1 is a flow diagram showing various processes involving bond pad sharing for powering a multiplicity of electrical components in accordance with embodiments of the disclosure. The bond pads may, but need not necessarily, be incorporated in a recording transducer. The processes shown in FIG. 1 involve biasing 102 a set of electrical bond pads, and activating 104 selected electrical components coupled to the bond pads. At least one of the electrical components shares 106 a bond pad with another electrical component. In some embodiments, the electrical components sharing the bond pad operate alternately 108. In other embodiments, the electrical components sharing the bond pad operate concurrently 110.

Figure 2:
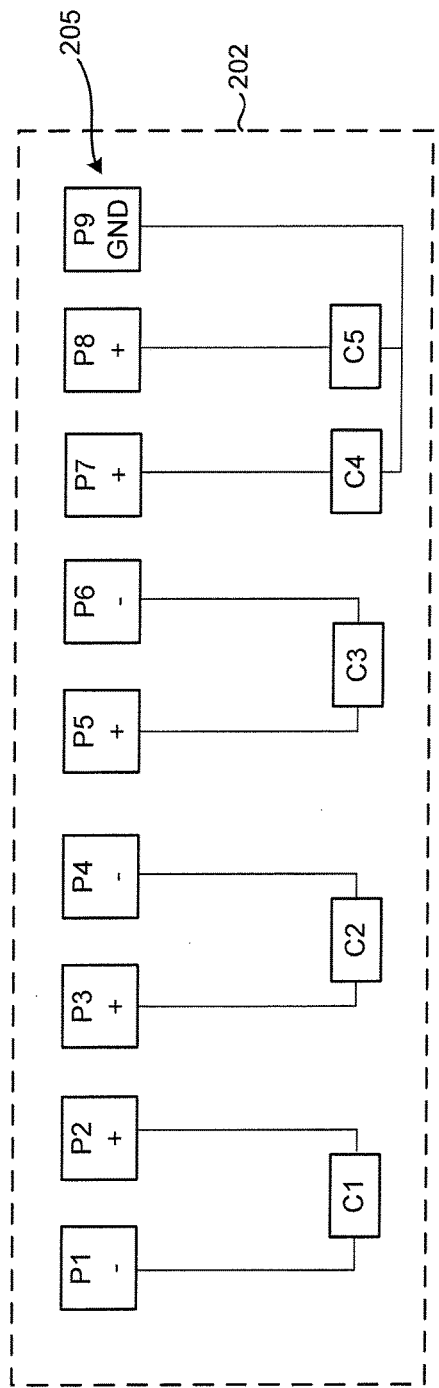
FIG. 2 illustrates an embodiment of a recording transducer that does not utilize pad sharing.
Figure 3:
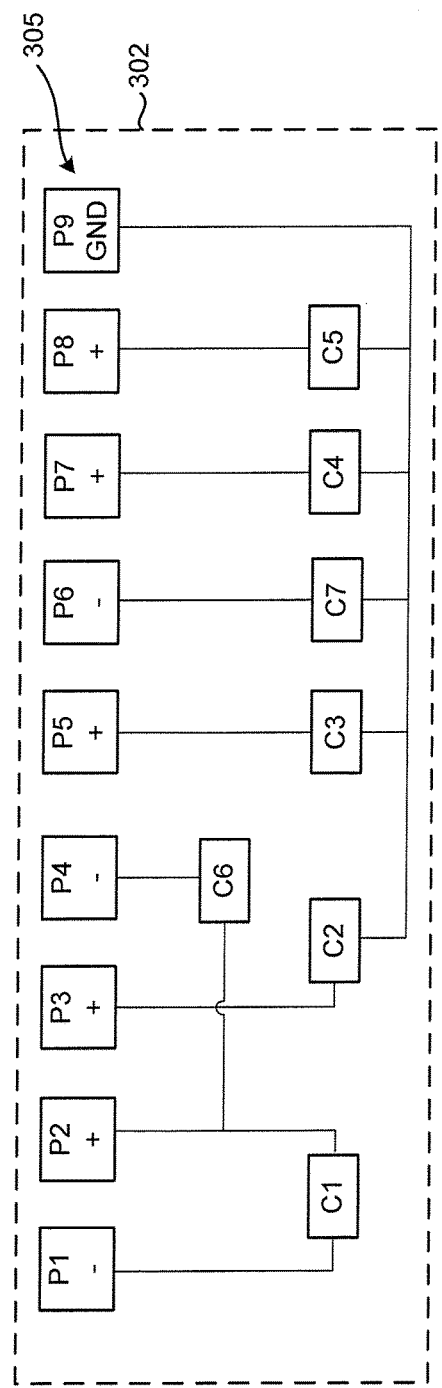
FIG. 3 shows a slider comprising a multiplicity of electrical bond pads coupled to bias sources and a number of electrical components each coupled to at least one of the electrical bond pads, wherein at least one of the electrical bond pads is shared between two or more electrical components in accordance with embodiments of the disclosure.

FIG. 2 illustrates an embodiment of a recording transducer that does not utilize pad sharing according to the present disclosure. FIG. 3 illustrates a recording transducer that utilizes pad sharing according to embodiments of the present disclosure. The bond pad layout shown in FIG. 2 is the same as that shown in FIG. 3, and the electrical components identified as C1-C5 in FIG. 2 are the same as those shown as components C1-C5 in FIG. 3 for purposes of illustration. It is understood that the bond pad layout, components, and wiring configuration shown in FIGS. 2 and 3 are provided for non-limiting illustrative purposes.

FIG. 2 illustrates a slider 202 that supports a recording transducer comprising a multiplicity of electrical components (C1-C5) coupled to a set 205 of bond pads (P1-P9). The set 205 of bond pads includes eight electrical bond pads (P1-P8) and one ground pad (P9, also referred to herein simply as ground). The term "electrical bond pad" refers to a bond pad that is coupled to a bias source, such as a voltage or current source (AC or DC), that provides power for an electrical component. The slider 202 shown in FIG. 2 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state. Similarly, the polarity of other components shown in the figures, such as drivers and pre-amplifiers (see, e.g., FIGS. 4-14), can change during operation.

FIG. 3 shows an apparatus according to various embodiments that includes a slider 302 comprising a plurality of electrical bond pads coupled to bias sources 305. The slider 302 further comprises a plurality of electrical components each coupled to at least one of the electrical bond pads. At least one of the electrical bond pads is shared between a plurality of the electrical components. According to some embodiments, the slider 302 supports a recording transducer comprising a multiplicity of electrical components (C1-C7) coupled to a set 305 of bond pads (P1-P9). As previously discussed, the set 305 of bond pads is the same as the bond pad set 205 shown in FIG. 2 (i.e., 8 electrical bond pads and 1 ground pad). In contrast to the slider 205 illustrated in FIG. 2 which supports five electrical components using eight electrical bond pads, the slider 305 shown in FIG. 3 supports seven electrical components while using the same number (i.e., 8) of electrical bond pads.

In FIG. 3, electrical bond pad P2 is shared between electrical components C1 and C6, thereby freeing up one electrical bond pad for other use or elimination. The electrical component C2 in FIG. 3, which performs the same function as C2 in FIG. 2, is implemented as a single-ended component, thereby freeing up one electrical bond pad for other use or elimination. By freeing up two electrical bond pads in the illustrative slider 302 shown in FIG. 3, two additional components (C6 and C7) have been added to the slider 302 as compared to the implementation illustrated in FIG. 2.

FIGS. 4-16 illustrate different implementations of bond pad sharing for powering a multiplicity of electrical components in accordance with various embodiments of the disclosure. FIGS. 4-5B are directed to implementations that provide for bond pad sharing between a multiplicity of readers in accordance with various embodiments. FIG. 4 is a representative bond pad layout 402 that facilitates bond pad sharing between two readers, and includes nine electrical bond pads and a ground pad. The bond pads shown in the representative layout 402 of FIG. 4 include: one electrical bond pad for each of a writer heater and a reader heater (both of which also share a ground pad to complete each circuit); three electrical bond pads (one of which is shared) for two readers; two electrical bond pads for a sensor (e.g., a dual-ended TCR sensor); a ground pad; and a bond pad pair for a dual-ended writer.

FIG. 5A is a schematic showing bond pad sharing between two readers in accordance with various embodiments. FIG. 5B is a block diagram showing bond pad sharing between the two readers of FIG. 5A according to various embodiments. In FIGS. 5A and 5B, two readers, R1 and R2, are coupled to three electrical bond pads, P1-P3. The electrical bond pads, P1-P3, are coupled to bias sources 504, such as DC current sources. The block diagram shown in FIG. 5B can include additional electrical bond pads, represented by bond pad(s) Pn, which provides connection to other electrical components. The two readers, R1 and R2, share a common electrical bond pad, P2. Each of the readers, R1 and R2, is coupled to a pre-amplifier, A and B, respectively. Read-back signals amplified and/or filtered by pre-amplifiers A and B are communicated to downstream read channel circuitry for further processing. It is to be understood that the pre-amplifiers and bias sources illustrated in FIG. 5B and other figures are shown as separate components for purposes of illustration and not of limitation. In some embodiments, the pre-amplifiers and bias sources may be integral to one or more common components (e.g., the pre-amplifiers/drivers are also the bias sources) or may be implemented as separate components.

Figure 6A:
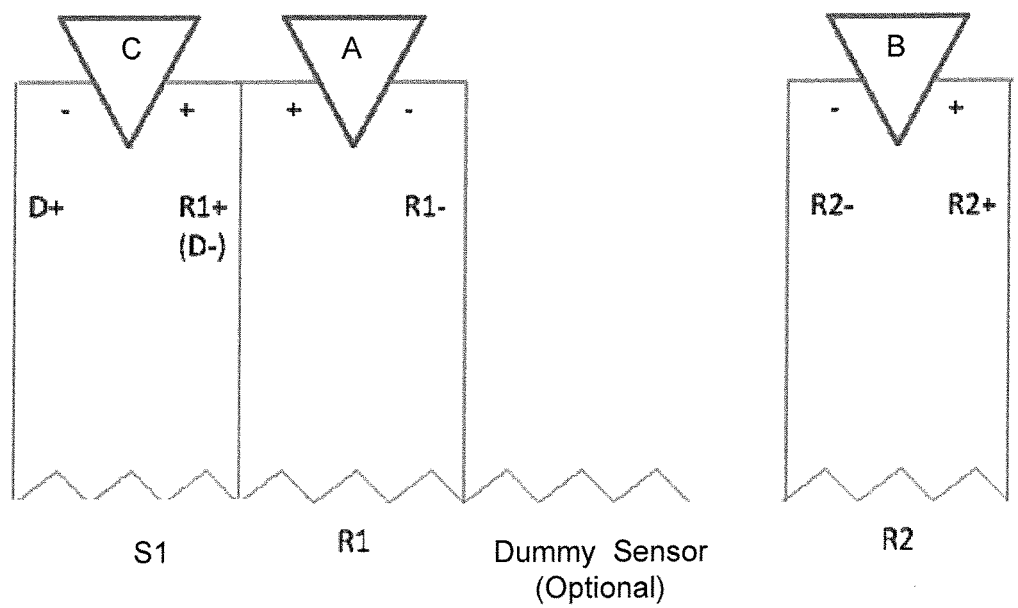
FIGS. 6A and 6B illustrate circuit and block diagram implementations for bond pad sharing by a sensor and one or more readers in accordance with various embodiments of the disclosure.
Figure 6B:
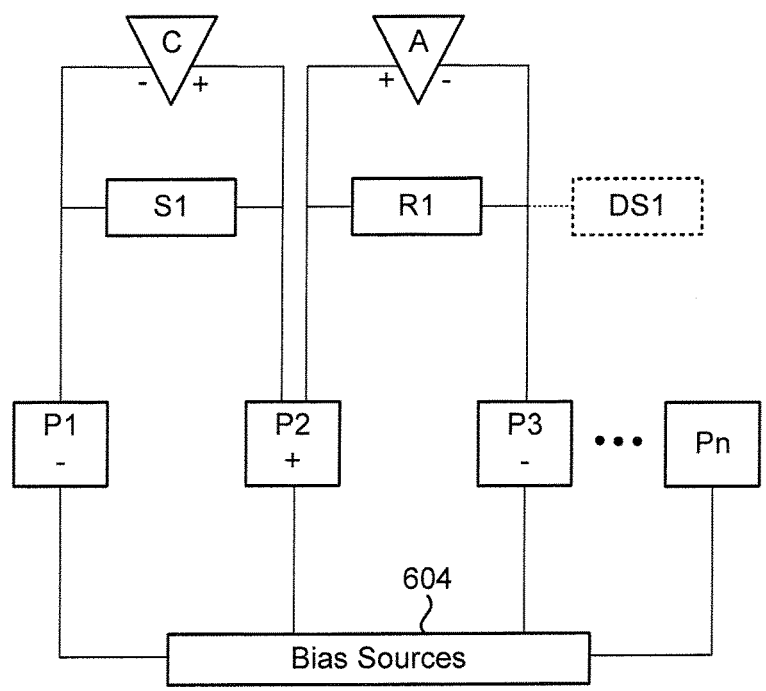

FIGS. 6A and 6B are directed to implementations that provide for bond pad sharing between a sensor and at least one reader in accordance with various embodiments. FIG. 6A is a schematic showing bond pad sharing between a sensor and one or more readers in accordance with various embodiments. FIG. 6B is a block diagram showing bond pad sharing between the sensor and a single reader shown in FIG. 6A according to various embodiments. In FIGS. 6A and 6B, a sensor, S1, is coupled between two electrical bond pads, P1 and P2. The sensor, S1, may be any type of sensor, such as a TCR contact sensor or a thermocouple. A reader, R1, is coupled between two electrical bond pads, P3 and shared pad P2. In some embodiments, a dummy sensor, DS1, can be incorporated into the circuitry to facilitate load balancing. The pad sharing implementation shown in FIGS.

6A and 6B reduces the needed electrical bond pad count by one bond pad when compared to an implementation that does not utilize bond pad sharing in accordance with embodiments of the present disclosure.

The electrical bond pads, P1-P3, are coupled to bias sources 604, such as DC current sources. The diagram shown in FIGS. 6A and 6B can include additional electrical bond pads, represented by bond pad(s) Pn, which provides connection to other electrical components (e.g., additional readers). The reader, R1, and the sensor, S1, are coupled to pre-amplifiers, A and C, respectively. Read-back and sensor signals amplified and/or filtered by pre-amplifiers A and B are respectively communicated to downstream circuitry for further processing.

Figure 7:
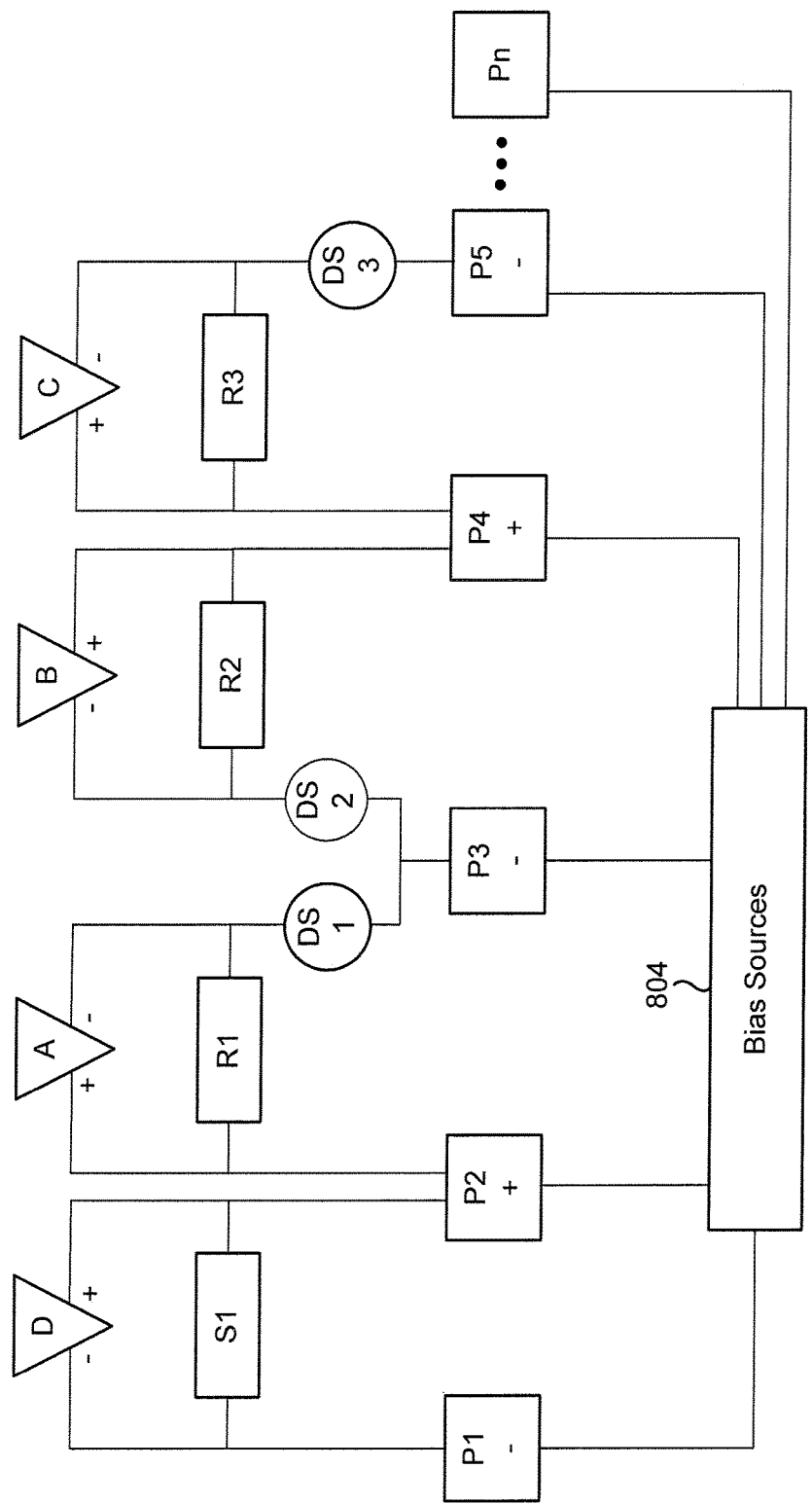
FIG. 7 is a block diagram showing bond pad sharing by a multiplicity of readers in accordance with various embodiments of the disclosure.

FIG. 7 is a block diagram showing bond pad sharing between a sensor and three readers in accordance with various embodiments. In the illustrative embodiment shown in FIG. 7, a sensor, S1, and a reader, R1, are coupled to a shared bond pad, P2. Readers R1 and R2 are coupled to shared bond pad P3 via optional dummy sensors DS1 and DS2 (i.e., load balancing elements), respectively. Readers R2 and R3 are coupled to shared bond pad P4, with reader R3 also coupled to bond pad P5 via optional dummy sensors DS3 (i.e., a load balancing element). In some embodiments, reader R1 coupled to the shared electrical bond pad P2 is configured to operate at times when the contact sensor S1 is not operating, while at least one of the other readers (e.g., R3) is configured to operate at times when the contact sensor S1 is operating. Other electrically active components can be included in the block diagram of FIG. 7, as indicated by the electrical component(s) Pn.

Figure 9:
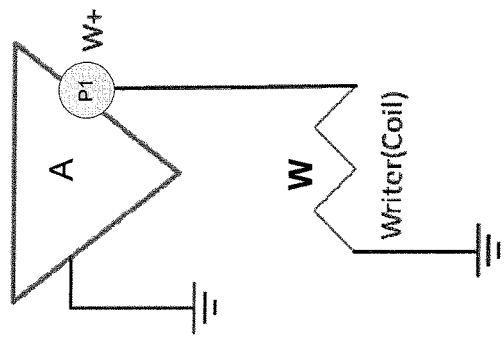
FIG. 9 is a circuit diagram of a single ended writer that frees up a bond pad of a recording head in accordance with various embodiments of the disclosure.
Figure 8:
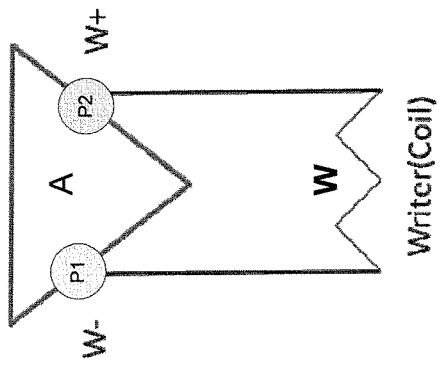
FIG. 8 is a circuit diagram of a dual ended writer of a recording head.

FIG. 8 illustrates a schematic of a writer, W, coupled to writer circuitry, A, via a pair of electrical bond pads, P1 and P2. In FIG. 8, the writer, W, is implemented as a dual-ended electrical component, requiring two electrical bond pads, P1 and P2. In accordance with various embodiments, and as shown in FIG. 9, a single-ended writer, W, is implemented which requires only a single electrical bond pad, P1, for proper operation. In particular, one end of writer W is coupled to electrical bond pad P1, and the other end of writer W is coupled to ground.

Figure 10:
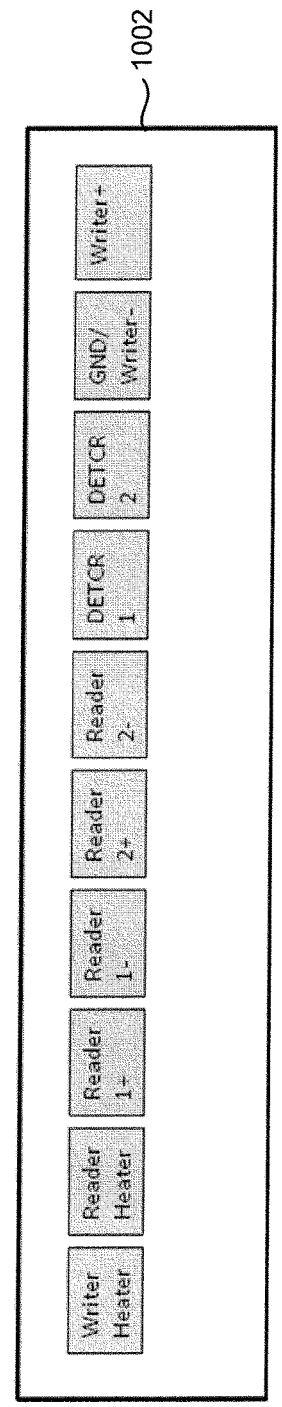
FIG. 10 illustrates a set of bond pads configured for powering a single ended writer and bond pad sharing by a multiplicity of readers in accordance with various embodiments of the disclosure.

A single-ended writer of the type shown in FIG. 9 can be implemented in a slider comprising a bond pad set such as that illustrated in FIG. 10. FIG. 10 is a representative bond pad layout 1002 that frees up one electrical bond pad (e.g., a negative writer pad) due to incorporation of a single-ended writer according to various embodiments. The bond pads shown in the representative layout 1002 of FIG. 10 include: one electrical bond pad for each of a writer heater and a reader heater (both of which also share a ground pad to complete each circuit); four electrical bond pads for two readers; one electrical bond pad for each of two sensors (e.g., single-ended TCR sensors); a ground pad; and a writer bond pad for powering a single-ended writer, which is coupled between the writer bond pad and a ground pad.

Figure 11:
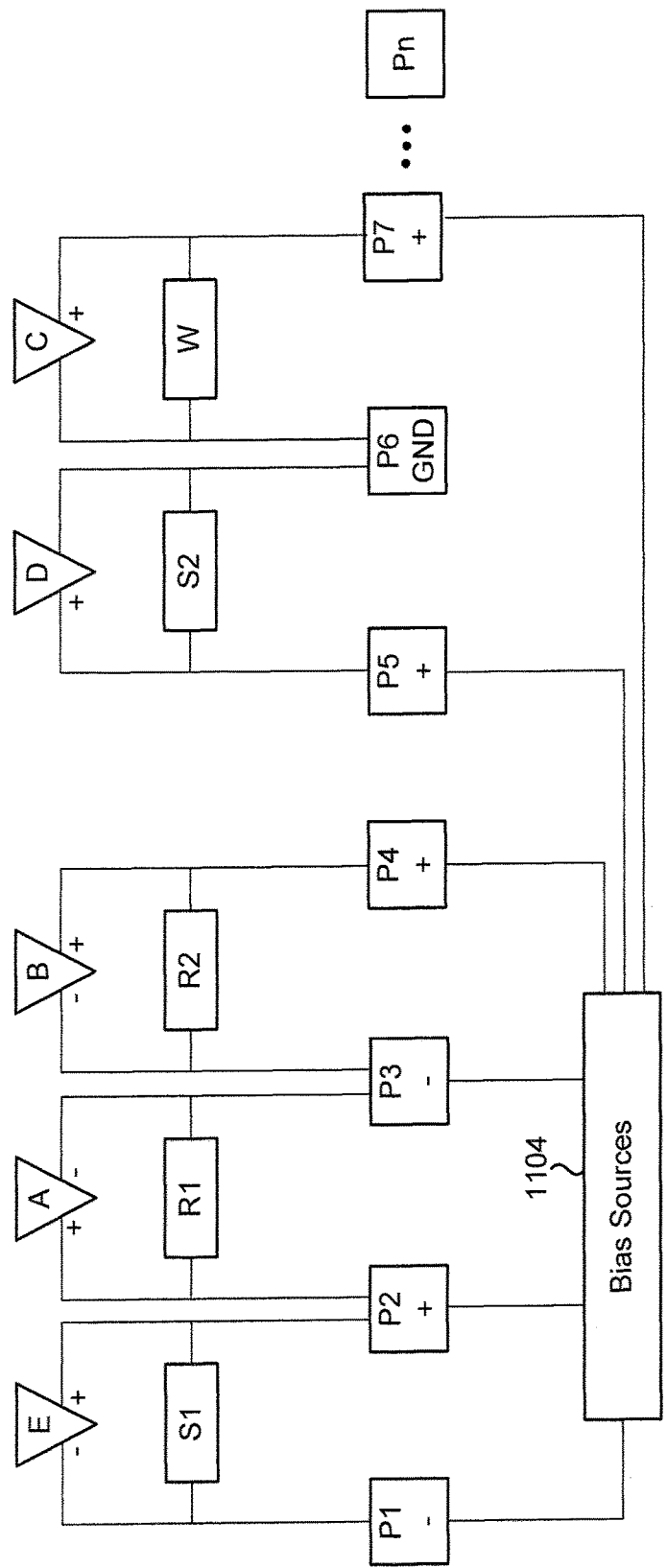
FIG. 11 is a block diagram of a configuration for powering a single ended writer and for effecting bond pad sharing by a sensor and a multiplicity of readers in accordance with various embodiments of the disclosure.

An apparatus, according to various embodiments and as illustrated in FIG. 11, can include a slider comprising a ground pad (P6 GND) and a plurality of electrical bond pads (P1-P5 and P7-Pn) coupled to bias sources 1104. The apparatus can further include a plurality of electrical components (S1, S2, R1, R2, W, etc.) of the slider each coupled to at least one of the electrical bond pads. A writer, W, of the slider is coupled between one of the electrical bond pads, P7, and the ground pad, P6. In some embodiments, the plurality of electrical bond pads can have a layout the same as, or similar to, that shown in FIG. 10. The implementation shown in FIG. 11 frees up one electrical bond pad by utilizing a single-ended writer, W, and one additional electrical bond pad by pad sharing between the two readers, R1 and R2. It is noted that the implementation shown in FIG. 11 includes a dual-ended sensor, S1, and a single-ended sensor, S2, for illustrative purposes.

Figure 12A:
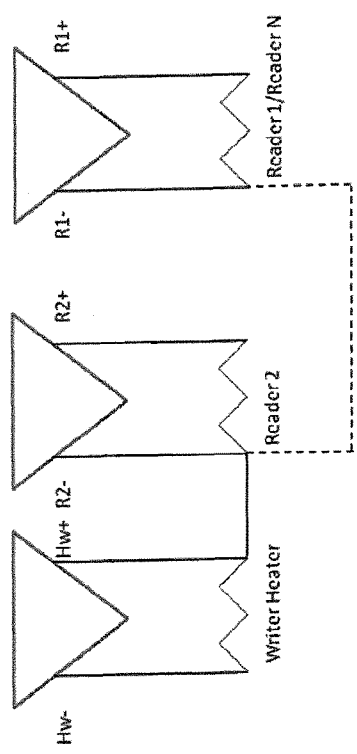
FIGS. 12A and 12B illustrate circuit and block diagram implementations for bond pad sharing by a writer heater and a multiplicity of readers in accordance with various embodiments of the disclosure.
Figure 12B:
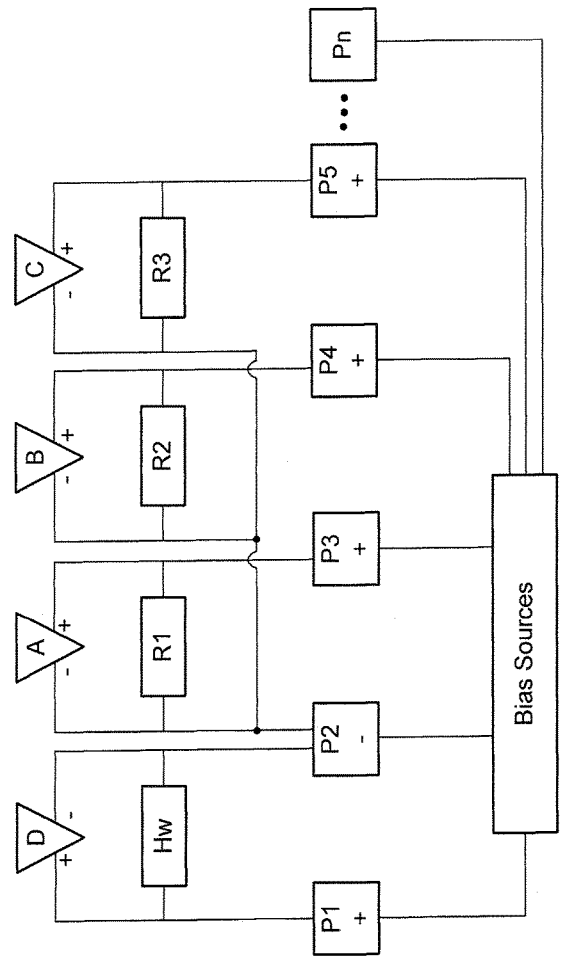

FIGS. 12A and 12B are directed to implementations that provide for bond pad sharing between a writer heater and at least one reader in accordance with various embodiments. FIG. 12A is a schematic showing bond pad sharing between a writer heater and one or more readers in accordance with various embodiments. FIG. 12B is a block diagram showing bond pad sharing between a writer heater and three readers according to various embodiments. In FIGS. 12A and 12B, a writer heater, Hw, is coupled between two electrical bond pads, P1 and P2. The writer heater, Hw, may be any type of heating element, such as a resistive heating element. As is best seen in FIG. 12B, each of three readers (R1, R2, R3) has one end coupled to an individual electrical bond pad (P2, P3, P4) and the other end coupled to a shared electrical bond pad, P2. In the representative configuration shown in FIG. 12B, implementing pad sharing between multiple readers according to various embodiments results in a net reduction in electrical pad count. For example, each of the writer heater, Hw, and three readers, R1-R3, can each be connected to two individual electrical bond pads, thereby requiring a total of eight electrical bond pads. The pad sharing implementation shown in FIG. 12B utilizes only five electrical bond pads (P1-P5) for biasing writer heater Hw and three readers R1-R3, thereby freeing up three electrical bond pads for other use or elimination.

Figure 13:
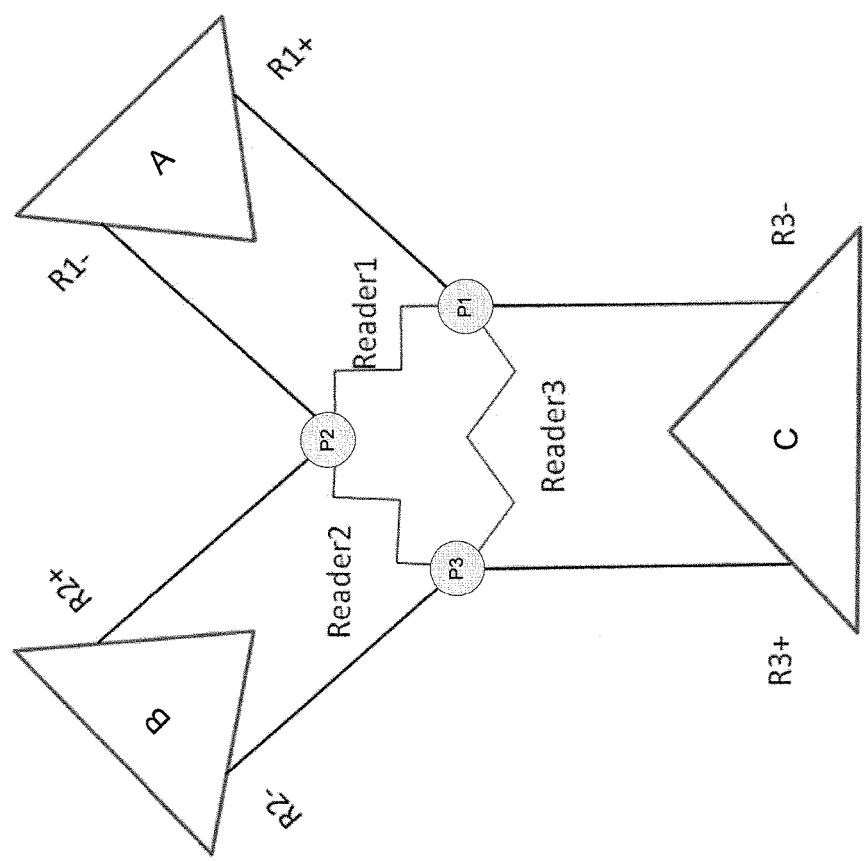
FIG. 13 is a schematic showing bond pad sharing between three readers connected in a delta configuration in accordance with various embodiments of the disclosure.

FIG. 13 is a schematic showing bond pad sharing between three readers in accordance with various embodiments. In FIG. 13, three readers, R1, R2, and R3, are each coupled to two of a total of three electrical bond pads, P1, P2, and P3. The multiple reader configuration shown in FIG. 13 can be referred to as a "delta" configuration, in which pairs of the three readers (e.g., Reader_1 and Reader_2) are coupled to one of three shared electrical bond pads (e.g., P2). The pad sharing implementation shown in FIG. 13 utilizes only three electrical bond pads (P1-P3), whereas a conventional connection approach requires six electrical bond pads, thereby freeing up three electrical bond pads for other use or elimination. The delta reader configuration shown in FIG. 13 can be implemented in a slider having a bond pad layout the same as, or similar to, that shown in FIG. 4 (e.g., a bond pad set that includes 3 electrical bond pads for the 3 readers).

Figure 14:
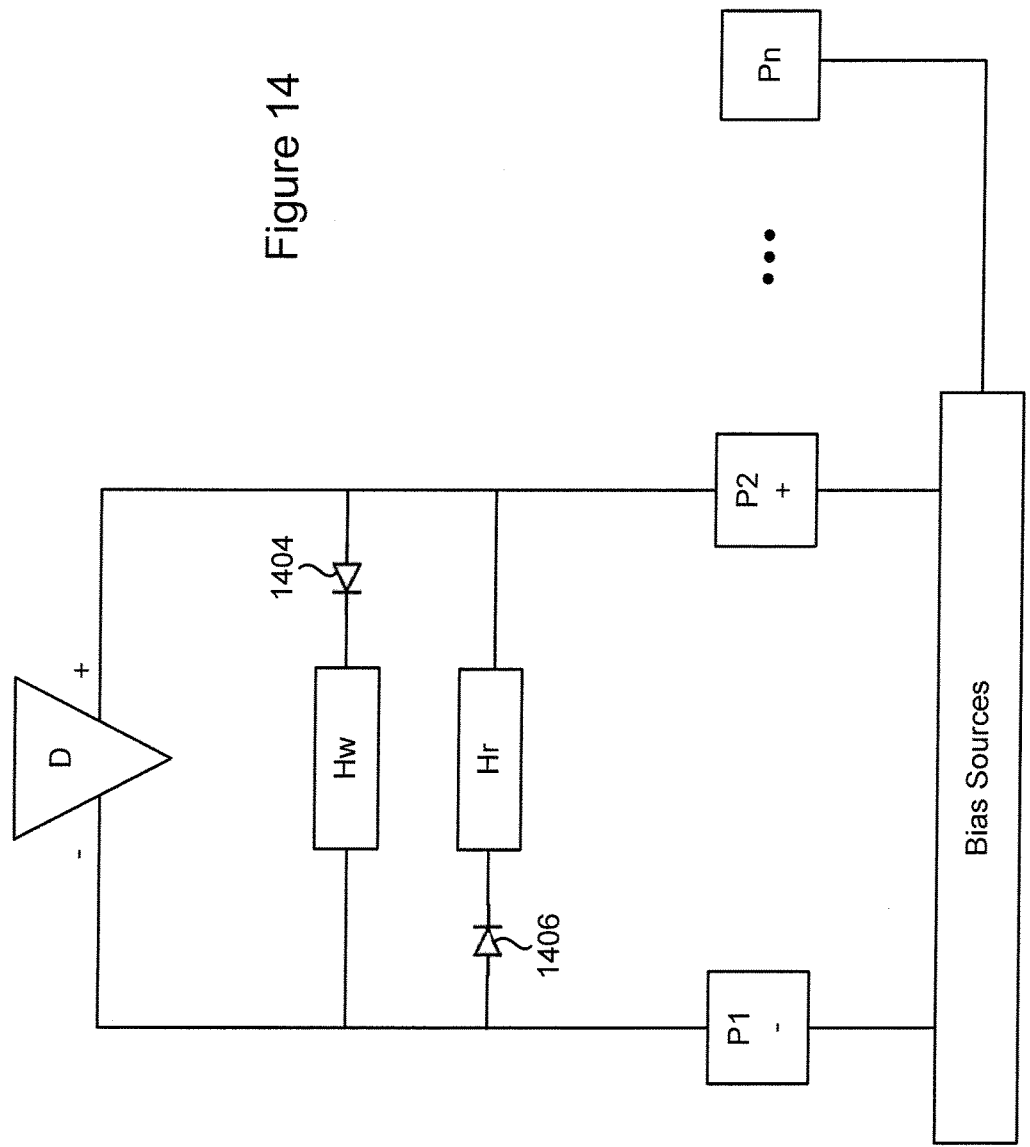
FIG. 14 is a block diagram showing bond pad sharing between two heaters in accordance with various embodiments of the disclosure.

FIG. 14 is a block diagram showing bond pad sharing between two heaters in accordance with various embodiments. In the representative embodiment illustrated in FIG. 14, a writer heater, Hw, and a reader heater, Hr, are coupled in parallel between two shared electrical bond pads, P1 and P2. Each of the writer and reader heaters, Hw and Hr, is coupled in series to a respective diode, 1404 and 1406. The writer and reader heaters, Hw and Hr, are configured to operate alternately depending on the direction of current flow between the two shared electrical bond pads, P1 and P2. For example, when current flows from bond pad P2 (positive) to bond pad P1 (negative), diode 1404 is forward biased (i.e., operates in a conductance state) while diode 1406 is reversed biased, resulting in current flow through the writer heater, Hw, but not through the reader heater, Hr. Contrastingly, when current flows from bond pad P1 (positive, not shown) to bond pad P2 (negative, not shown), diode 1406 is forward biased (i.e., operates in a conductance state) while diode 1404 is reversed biased, resulting in current flow through the reader heater, Hr, but not through the writer heater, Hw.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a slider comprising a plurality of electrical bond pads coupled to bias sources;
   a plurality of electrical components of the slider each coupled to at least one of the electrical bond pads;
   at least one of the electrical bond pads is a shared electrical bond pad coupled to at least two of the electrical components; and
   circuitry configured to operate the plurality of electrical components alternately with respect to one another.

2. The apparatus of claim 1, wherein the plurality of electrical components comprises disparate electrical components.

3. The apparatus of claim 1, wherein:
   the plurality of electrical components comprises at least two readers; and
   the at least two readers are coupled to the shared electrical bond pad.

4. The apparatus of claim 3, wherein a termination load is connected to an unshared electrical bond pad as between the at least two readers.

5. The apparatus of claim 1, wherein:
   the plurality of electrical components comprises at least two readers and at least one contact sensor; and
   the contact sensor and one of the at least two readers are coupled to the shared electrical bond pad.

6. The apparatus of claim 5, wherein:
   the one reader coupled to the shared electrical bond pad is configured to operate at times when the contact sensor is not operating; and
   the other of the at least two readers is configured to operate at times when the contact sensor is operating.

7. The apparatus of claim 5, wherein the slider comprises a dummy contact sensor coupled to the one of the at least two readers coupled to the shared electrical bond pad.

8. The apparatus of claim 1, wherein
   the plurality of electrical components comprises a writer; and
   the writer is coupled between one of the electrical bond pads and a ground.

9. The apparatus of claim 1, wherein:
   the plurality of electrical components comprises a writer heater and at least two readers; and
   the writer heater and one of the at least two readers are coupled to the shared electrical bond pad.

10. The apparatus of claim 1, wherein:
    the plurality of electrical components comprises three readers, and pairs of the three readers are coupled to one of three shared electrical bond pads.

11. The apparatus of claim 1, wherein:
    the plurality of electrical components comprises a writer heater and a reader heater; and
    the writer heater and reader heater are coupled to the shared electrical bond pad.

12. The apparatus of claim 11, wherein:
    the writer heater and reader heater are coupled in parallel between the two shared electrical bond pads; and
    each of the writer and reader heaters is coupled in series to a respective diode, the writer and reader heaters configured to operate alternately depending on the direction of current flow between the two shared electrical bond pads.

13. A system, comprising:
    a bond pad set electrically connected to a plurality of electrical components and comprising at least one ground pad and at least one electrical bond pad, the at least one electrical bond pad shared between two or more of the electrical components; and
    circuitry configured to operate the plurality of electrical components alternately with respect to one another.

14. The system of claim 13, wherein the plurality of electrical components comprises disparate electrical components.

15. The system of claim 13, wherein the plurality of electrical components comprises at least two readers.

16. The system of claim 13, wherein the plurality of electrical components comprises at least two readers, and a termination load is connected to an unshared electrical bond pad as between the at least two readers.

* * * * *